United States Patent
Ho et al.

(10) Patent No.: US 10,649,559 B2
(45) Date of Patent: May 12, 2020

(54) HANDHELD ELECTRONIC APPARATUS AND TOUCH DETECTION METHOD THEREOF

(71) Applicant: HTC Corporation, Taoyuan (TW)

(72) Inventors: Chia-Chu Ho, Taoyuan (TW); Hao-Tien Yen, Taoyuan (TW); Shih-Hung Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/910,013

(22) Filed: Mar. 2, 2018

(65) Prior Publication Data

US 2018/0307366 A1 Oct. 25, 2018

Related U.S. Application Data

(60) Provisional application No. 62/487,490, filed on Apr. 20, 2017.

(51) Int. Cl.
| | |
|---|---|
| *G06F 3/041* | (2006.01) |
| *G06F 1/3296* | (2019.01) |
| *G06F 1/3234* | (2019.01) |
| *G06F 1/3287* | (2019.01) |
| *G06F 1/3231* | (2019.01) |

(52) U.S. Cl.
CPC .............. *G06F 3/041* (2013.01); *G06F 1/325* (2013.01); *G06F 1/3231* (2013.01); *G06F 1/3262* (2013.01); *G06F 1/3287* (2013.01); *G06F 1/3296* (2013.01); *G06F 3/0416* (2013.01); *G06F 3/0414* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2010/0066696 A1* | 3/2010 | Yang | ..................... | G06F 1/3231 345/173 |
| 2010/0138680 A1* | 6/2010 | Brisebois | .............. | G06F 1/1626 713/324 |
| 2011/0312349 A1* | 12/2011 | Forutanpour | ......... | G06F 1/1626 455/466 |
| 2014/0136867 A1* | 5/2014 | Yamamoto | ............ | G06F 1/3262 713/320 |
| 2015/0253927 A1* | 9/2015 | Noto | ..................... | G06F 1/3218 345/174 |

* cited by examiner

*Primary Examiner* — Christopher J Kohlman
(74) *Attorney, Agent, or Firm* — JCIPRNET

(57) ABSTRACT

A handheld electronic apparatus includes a housing, a plurality of touch sensors, and a controller. The controller under power saving mode activates parts of touch sensors to execute a touch detection action.

16 Claims, 3 Drawing Sheets

HANDHELD ELECTRONIC APPARATUS AND TOUCH DETECTION METHOD THEREOF

CROSS-REFERENCE TO RELATED APPLICATION

This application claims the priority benefit of U.S. provisional application Ser. No. 62/487,490, filed on Apr. 20, 2017. The entirety of the above-mentioned patent application is hereby incorporated by reference herein and made a part of specification.

BACKGROUND OF THE INVENTION

Field of the Invention

The invention is related to a hand-held electronic apparatus and a touch detection method thereof, and particularly to a hand-held electronic apparatus and a touch detection method thereof which can save power consumption.

Description of Related Art

In existing mobile devices, touch technology has been widely applied to various hand-held electronic apparatuses such as mobile phone, digital camera, tablet PC and so on. In recent years, the concept of edge sense has been applied to consumer electronic products. Users can use various gestures to directly activate functions such as photographing, multi-media operation and so forth of hand-held electronic apparatus through edge sensor.

However, when performing detection through the edge sensor, since the edge sensor keeps scanning, power consumption is increased and the battery life of the hand-held electronic apparatus is reduced.

SUMMARY OF THE INVENTION

The invention provides a hand-held electronic apparatus and a touch detection method thereof. The hand-held electronic apparatus and the touch detection method thereof have low-power mode for reducing power consumption of the hand-held electronic apparatus.

A hand-held electronic apparatus provided in the invention includes a housing, a plurality of touch sensors and a controller. The touch sensor is disposed on at least one lateral side of the housing. The controller is coupled to the touch sensor. The controller under power saving mode activates a part of the touch sensors to execute a touch detection action.

A touch detection method provided in the invention includes the following steps. A plurality of touch sensors are provided to be disposed on at least one lateral side of the hand-held electronic apparatus, and a part of the touch sensors are activated under power-saving mode to execute touch detection action.

According to the above, the hand-held electronic apparatus provided in the invention under power-saving mode may select a part of the touch sensors on two lateral sides of the hand-held electronic apparatus and alternately activate the touch sensors in sequence to execute touch detection action, such that only a part of the touch sensors execute the detection action in every time period, thereby saving the power consumption of the hand-held electronic apparatus and improving battery life.

In order to make the aforementioned features and advantages of the invention more comprehensible, embodiments accompanying figures are described in detail below.

DESCRIPTION OF EMBODIMENTS

Figure 1:
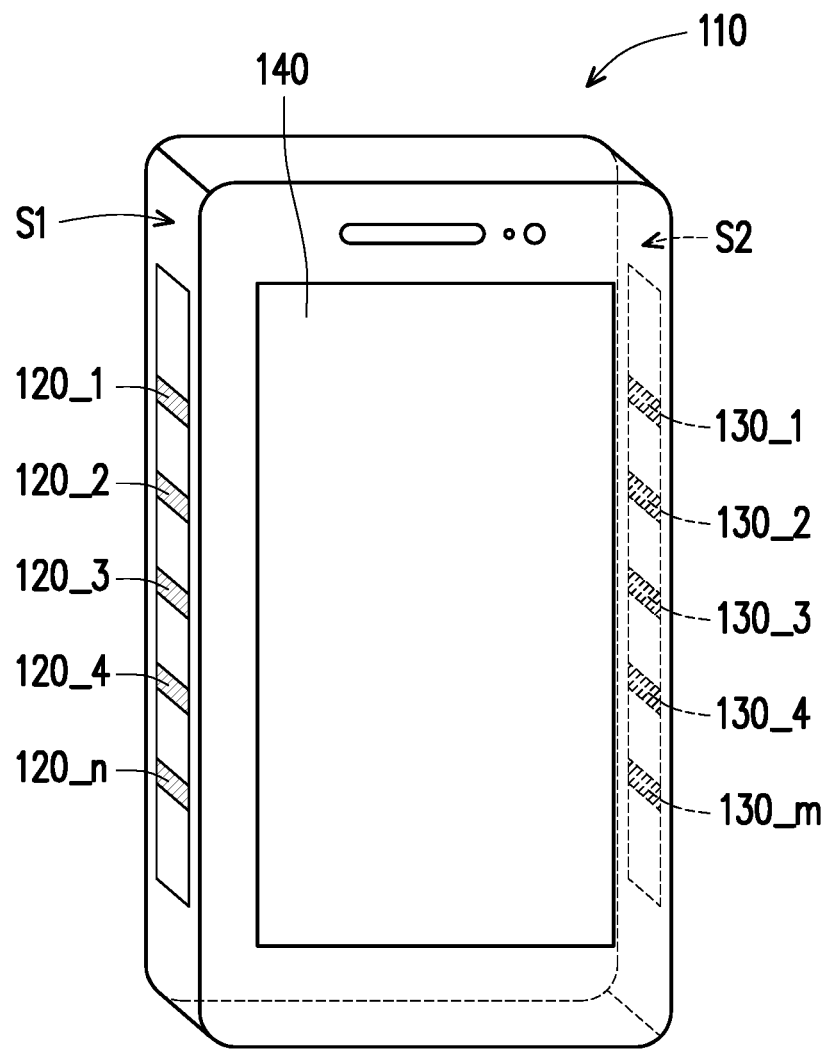
FIG. 1 is a schematic view of a hand-held electronic apparatus according to an embodiment of the invention.

Referring to FIG. 1, FIG. 1 is a schematic view of a hand-held electronic apparatus according to an embodiment of the invention. A hand-held electronic apparatus 100 includes a housing 110, a plurality of touch sensors 120_1-120_n, a plurality of touch sensors 130_1-130_m and a display 140. The housing 110 is a housing portion of the hand-held electronic apparatus, the invention provides no limitation to the material and structure of the housing 110. In the exemplary embodiment, the plurality of touch sensors 120_1-120_n are disposed on a lateral side S1 of the housing 110, and the plurality of touch sensors 130_1-130_m are disposed on a lateral side S2 of the housing 110, wherein the lateral side S1 and the lateral side S2 are opposite to each other. However, the invention provides no limitation to the position of the plurality of touch sensors 120_1-120_n and the plurality of touch sensors 130_1-130_m. In other embodiments, the plurality of touch sensors 120_1-120_n and the plurality of touch sensors 130_1-130_m may be respectively disposed on any side of the hand-held electronic apparatus 100. The display 140 has display function and is disposed on a surface of the hand-held electronic apparatus 100.

Figure 2:
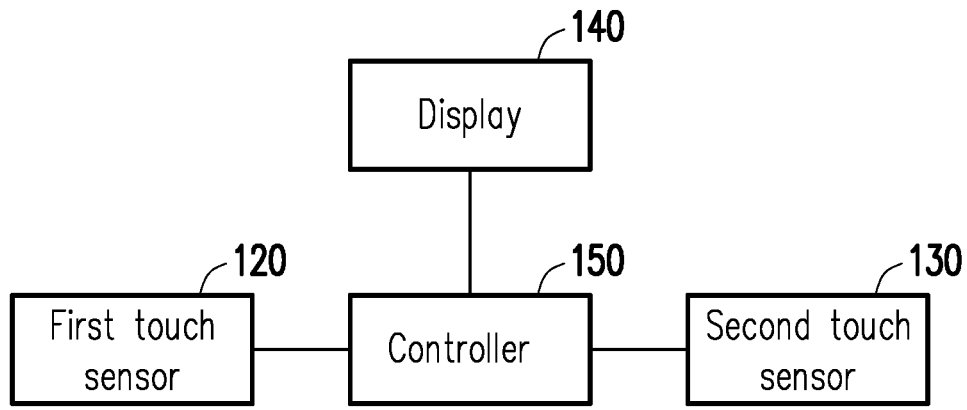
FIG. 2 is a block view of a hand-held electronic apparatus according to an embodiment of the invention.

FIG. 2 is a block view of a hand-held electronic apparatus according to an embodiment of the invention. Referring to FIG. 2, the hand-held electronic apparatus 100 further includes a controller 150, wherein the controller 150 is coupled to the plurality of touch sensors 120_1-120_n and the plurality of touch sensors 130_1-130_m to receive a touch detection value. The touch detection value is generated by the plurality of touch sensors 120_1-120_n and the plurality of touch sensors 130_1-130_m. The controller 150 may be a central processing unit (CPU), a microcontroller (MCU), an application-specific integrated circuit (ASIC), a field programmable gate array (FPGA) or similar element or a combination of the above. The controller 150 is programmed to execute the following functions or steps.

Referring to FIG. 1, in the exemplary embodiment, the plurality of touch sensors 120_1-120_n and the plurality of touch sensors 130_1-130_m may be respectively disposed on the lateral side S1 and the lateral side S2 of the hand-held electronic apparatus 100 to execute touch detection action. The touch sensors 120_1-120_n and 130_1-130_m execute the touch detection action through detecting whether a pressing action is performed, and generate a touch detection value through the touch detection action. In the embodiment, the touch sensors 120_1-120_n and the touch sensors 130_1-130_m respectively detect the pressure applied to the lateral side S1 and the lateral side S2 of the hand-held electronic apparatus 100, and provide the detected touch detection value (e.g., pressure value) to the controller 150. In the exemplary embodiment, the touch sensors 120_1-120_n and 130_1-130_m may be a piezoelectric sensor, a capacitive sensor, a resistive sensor or other types of touch sensors. Here, the invention provides no limitation to the number, type and position of the touch sensors 120_1-120_n and 130_1-130_m disposed on the lateral sides.

In the embodiment, the touch sensors 120_1-120_n and 130_1-130_m may be a piezoelectric sensor configured to detect the pressure applied along a specific direction through physical means. For example, the piezoelectric sensor may convert the detected kinetic energy into a touch detection value using an electrical signal as a carrier. The controller 150 may determine the amount of pressure and distribution of pressure applied to each of the touch sensors 120_1-120_n and the touch sensors 130_1-130_m according to the touch detection value generated via the touch detection action.

In other embodiments, the touch sensors 120_1-120_n and 130_1-130_m may be a capacitive sensor, a resistive sensor or other types of touch sensors known to persons of ordinary skill in the art, and the invention provides no limitation thereto.

Here, the controller 150 may determine whether the touch detection value is a valid touch detection value by judging whether the touch detection value transmitted by the touch sensor is larger than a predetermined threshold value in a fixed time interval. The controller 150 may send a command according to the valid touch detection value, and drive the hand-held electronic apparatus 100 to execute a corresponding action. The predetermined threshold value may be set by designer depending on actual circumstances, and the invention provides no limitation thereto.

Referring to FIG. 1, in the exemplary embodiment, the hand-held electronic apparatus 100 may be operated under three operation modes, including normal operation mode, power-saving mode and idle mode.

The power-saving mode is applicable in the following circumstances, for example, when the user neither uses the hand-held electronic apparatus 100 for a period of time nor performs any operation on the hand-held electronic apparatus 100 such as the user putting the hand-held electronic apparatus 100 in backpack for a long period of time, the hand-held electronic apparatus 100 may enter the power-saving mode. In the power-saving mode, the controller 150 may select a part of the touch sensors among the touch sensors 120_1-120_n such as 120_2, 120_3 and 120_n as the selected touch sensors, and select a part of the touch sensors among the touch sensors 130_1-130_m such as touch sensors 130_1, 130_3 and 130_4 as the selected touch sensors.

Next, in the power-saving mode, the controller 150 may activate an alternating detection mechanism, and execute the touch detection action by alternately activating the selected touch sensors disposed on the lateral side S1 and the lateral side S2 according to a frequency in a predetermined sequence.

For example, the controller 150 may activate the selected touch sensor 120_2 on the lateral side S1 first to execute touch detection action, and then activate the selected touch sensor 130_1 on the lateral side S2 to execute touch detection action. Next, the controller 150 activates the selected touch detector 120_3 on the lateral side S1 to execute touch detection action, and then activates the selected touch sensor 130_3 on the lateral side S2 to execute touch detection action. Finally, the controller 150 activates the selected touch sensor 120_n on the lateral side S1 to execute touch detection action, and then activates the selected touch sensor 1304 on the lateral side S2 to execute touch detection action.

In the embodiment, the non-selected touch sensor under power-saving mode may maintain not to be activated to save unnecessary power consumption.

It should be noted that the above description serves for exemplary purpose only, and the invention provides no limitation to the sequence according to which the plurality of selected touch sensors are activated under the power-saving mode. Moreover, the number of the selected touch sensors on each of the lateral sides S1 and S2 is not necessarily the same. Furthermore, it should be indicated that in the alternating detection mechanism under power-saving mode, the scanning frequency according to which the controller 150 performs alternating detection mechanism is relatively lower than the scanning frequency according to which the touch sensors perform touch detection under normal mode. For example, in the alternating detection mechanism under the power-saving mode, the scanning frequency for performing the alternating detection mechanism may be 10 Hz or 20 Hz. Under the normal mode, the scanning frequency according to which the touch sensors execute touch detection action may be 100 Hz.

The above descriptions show that, in the embodiment of the invention, the controller 150 under power-saving mode only selects a part of the touch sensors to execute the touch scanning action, and executes scanning action of the selected touch sensors through the scanning frequency with relatively low frequency. On the premise that the hand-held electronic apparatus 100 maintains normal operation, unnecessary power consumption may be saved, thereby improving operation performance of the hand-held electronic apparatus 100.

On the other hand, the normal operation mode is applicable in the following circumstances, for example, the user continues performing touch operation on the hand-held electronic apparatus 100. The controller 150 receives the touch detection value generated by the touch sensors 120_1-120_n and 130_1-130_m, and the controller 150 determines whether the received touch detection value is a valid touch detection value, and determines the touch operation that is performed by the user on the hand-held electronic apparatus 100 according to the valid touch detection value.

In the exemplary embodiment, under the normal operation mode, the controller 150 may activate an alternating scanning mechanism, in the alternating scanning mechanism, a part of the touch sensors among the touch sensors 120_1-120_n are selected to serve as the selected touch sensors, and a part of the touch sensors among the touch sensors 130_1-130_m are selected to serve as the selected touch sensors. For example, the touch sensor 120_2, the touch sensor 120_3 and the touch sensor 120_n, the touch sensor 130_1, the touch sensor 130_3 and the touch sensor 130_4 are selected as the selected touch sensors, and the rest of the touch sensors are the non-selected sensors. The controller 150 under the alternating scanning mechanism may make the touch sensor 120_2, the touch sensor 130_1 and the touch sensor 120_3, the touch sensor 130_3, the touch sensor 120_n and the touch sensor 130_4 perform scanning alternately according to a frequency (e.g., 100 Hz).

In the above exemplary embodiment, the controller 150 may make the selected touch sensors disposed on different lateral sides S1 and S2 perform scanning action alternately, and makes that an average number of the selected touch sensors on different lateral sides S1 and S2 of the hand-held electronic apparatus 100 that are scanned in one time interval to be the same. In the embodiment, the non-selected touch sensors may be disposed on a non-activated status.

On the other hand, under the normal operation mode, the controller 150 may activate a fine scanning mechanism. Under the fine scanning mechanism, all of the touch sensors 120_1-120_n and 130_1-130_m are selected touch sensors. The controller 150 may set a fixed sequence and make touch sensors 120_1-120_n and 130_1-130_m perform the touch scanning action in sequence according to a frequency (e.g., 100 Hz).

Regarding the alternating scanning mechanism and the fine scanning mechanism, the controller 150 may switch the above-mentioned mechanisms according to the status in which the hand-held electronic apparatus 100 is actually used. For example, when the user frequently operates the hand-held electronic apparatus 100 through the touch sensors 120_1-120_11 and 130_1-130_m, the controller 150 may activate the fine scanning mechanism. Relatively, if the user operates the hand-held electronic apparatus 100 but mainly through other type of operation interface (e.g., touch device on screen), the controller 150 may activate the alternating scanning mechanism.

It should be mentioned that, under the power-saving mode, the controller 150 may switch the normal operation mode and the power-saving mode according to the status in which the valid touch detection value is generated. When the occurring frequency of the valid touch detection value is larger than the predetermined threshold frequency, the controller 150 may make the hand-held electronic apparatus 100 switch from the power-saving mode to the normal operation mode.

Regarding the idle mode, the idle mode is applicable in the following circumstances, for example, the user is using the hand-held electronic apparatus 100 but not performing touch operation on the hand-held electronic apparatus 100 (e.g., the hand-held electronic apparatus 100 executes application program for playing multi-media video).

In the exemplary embodiment, under the idle mode, the controller 150 may respectively select a part of the touch sensors among the touch sensors 120_1-120_n and 130_1-130_m to serve as the selected touch sensors. Subsequently, under the idle mode, the controller 150 may activate the alternating detection mechanism to alternately activate the selected touch sensors on the lateral side S1 and the lateral side S2 according to the relatively low scanning frequency (e.g., 20 Hz) to execute the touch detection action.

Certainly, the controller 150 may activate the selected touch sensors in sequence according to the predetermined order. In the embodiment, the number of the selected touch sensors on the lateral side S1 and the lateral side S2 may be the same or different, the invention provides no limitation thereto.

Figure 3:
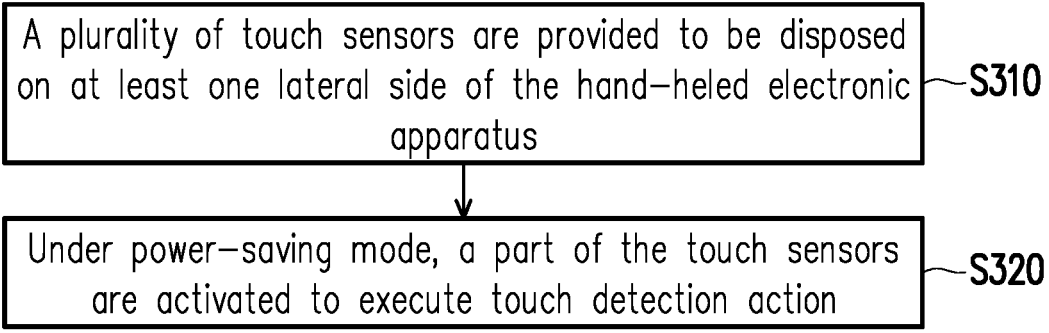
FIG. 3 is a flowchart illustrating touch detection according to an embodiment of the invention.

Referring to FIG. 3, FIG. 3 is a flowchart illustrating touch detection according to an embodiment of the invention. Step S310 provides the plurality of touch sensors to be disposed on at least one lateral side of the hand-held electronic apparatus. Next, in step S320, under power-saving mode, the touch detection action is executed through a part of the touch sensors which are activated, wherein the touch detection action generates a touch detection value through the activated touch sensors.

Regarding to the implementation method and implementation details of the above steps are thoroughly explained in the embodiments provided above, and thus no repetition is incorporated herein.

Figure 4:
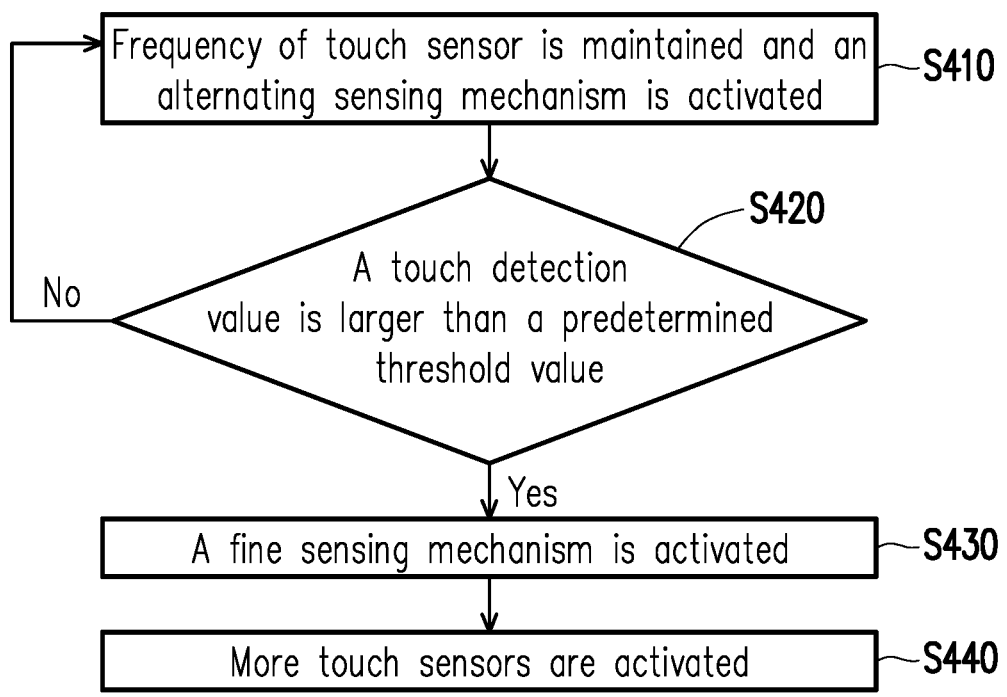
FIG. 4 is a flowchart showing mode switching of touch detection according to an embodiment of the invention.

Referring to FIG. 4, FIG. 4 is a flowchart showing mode switching of touch detection according to an embodiment of the invention. In step S410, under the power-saving mode, the controller may maintain the relatively low scanning frequency of the touch sensor and activate an alternating detection mechanism to alternately activate the touch sensors on different lateral sides of the hand-held electronic apparatus in sequence according to the set order to execute touch detection action. Next, in step S420, when the controller determines that the touch detection value generated by the touch detection action is larger than the predetermined thresholds value, that is, the controller determines that the user is performing touch operation frequently, then step S430 is correspondingly performed; if not, step S410 is resumed. In step S430, the controller activates a fine sensing mechanism, and the touch sensors or fine sensors are activated in order to execute the touch detection action. In step S440, the controller activates more touch sensors to improve touch detection performance.

In summary, according to the invention, the hand-held electronic apparatus under the power-saving mode may activate a part of the touch sensors to execute touch detection action. In an embodiment, it is possible to set the normal operation mode and the idle mode depending on the user circumstances to achieve low power consumption and touch detection performance simultaneously, thereby improving the battery life of the hand-held electronic apparatus and improving user experience.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A hand-held electronic apparatus, comprising:
   a housing;
   a plurality of touch sensors, disposed on at least one lateral side of the housing, wherein the touch sensors comprise a plurality of first touch sensors and a plurality of second touch sensors; the first touch sensors are disposed on a first lateral side of the housing, and the second touch sensors are disposed on a second lateral side of the housing, wherein the first lateral side is opposite to the second lateral side;
   a controller, coupled to the touch sensors,
   wherein the controller under a power-saving mode selects a part of the first touch sensors to be a plurality of first selected touch sensors, selects a part of the second touch sensors to be a plurality of second selected touch sensors, and activates the plurality of the first selected touch sensors and the plurality of the second selected touch sensors in an alternating sequence,
   wherein in the alternating sequence, only one of the plurality of the first selected touch sensors is activated and followed by activating only one of the plurality of the second selected touch sensors.

2. The hand-held electronic apparatus according to claim 1, wherein the controller under a normal operation mode sets a scanning frequency of the touch detection action to be a first frequency.

3. The hand-held electronic apparatus according to claim 2, wherein the controller under the power-saving mode further sets the scanning frequency of the touch detection action to be a second frequency, wherein the second frequency is lower than the first frequency.

4. The hand-held electronic apparatus according to claim 1, wherein when a touch detection value generated via the touch detection action is larger than a predetermined threshold value, the controller is switched to a normal operation mode from the power-saving mode.

5. The hand-held electronic apparatus according to claim 4, wherein the controller under the normal operation mode selects a part of the first touch sensors to be a plurality of first selected touch sensors, selects a part of the second touch sensors to be a plurality of second selected touch sensors, and alternatively activates each of the first selected touch sensors and each of the second selected touch sensors in sequence to execute the touch detection action.

6. The hand-held electronic apparatus according to claim 4, wherein the controller under the normal operation mode makes each of the touch sensors to execute the touch detection action in sequence.

7. The hand-held electronic apparatus according to claim 1, wherein the controller under an idle mode makes each of the touch sensors to execute the touch detection action sequence.

8. The hand-held electronic apparatus according to claim 7, wherein the controller under the idle mode makes a scanning frequency of the touch detection action to be a first frequency; wherein the first frequency is lower than a scanning frequency of the touch detection action with the controller under the normal operation mode.

9. The hand-held electronic apparatus according to claim 7, wherein the controller under the idle mode selects a part of the first touch sensors to be a plurality of first selected touch sensors, selects a part of the second touch sensors to be a plurality of second selected touch sensors, and alternatively activates each of the first selected touch sensors and each of the second selected touch sensors in sequence according to the first frequency to execute the touch detection action.

10. A touch detection method of a hand-held electronic apparatus, comprising:
  providing a plurality of touch sensors to be disposed on at least one lateral side of the hand-held electronic apparatus;
  separating the touch sensors into a plurality of first touch sensors and a plurality of second touch sensors; and
  activating a part of the touch sensors under a power-saving mode, selecting a part of the first touch sensors to be a plurality of first selected touch sensors, selecting a part of the second touch sensors to be a plurality of second selected touch sensors, and activating the plurality of the first selected touch sensors and the plurality of the second selected touch sensors in an alternating sequence,
  wherein in the alternating sequence, only one of the plurality of the first selected touch sensors is activated and followed by activating only one of the plurality of the second selected touch sensors.

11. The touch detection method according to claim 10, further comprising:
  setting a scanning frequency of the touch detection action to be a first frequency under a normal operation mode.

12. The touch detection method according to claim 11, wherein the step of activating the part of the touch sensors under the power-saving mode to execute the touch detection action further comprises:
  setting a scanning frequency of the touch detection action to be a second frequency under the power-saving mode, wherein the second frequency is lower than the first frequency.

13. The touch detection method according to claim 10, further comprising:
  switching from the power-saving mode to a normal operation mode when a touch detection value generated via the touch detection action is larger than a predetermined threshold value.

14. The touch detection method according to claim 13, further comprising:
  under the normal operation mode, selecting a part of the first touch sensors to be a plurality of first selected touch sensors, selecting a part of the second touch sensors to be a plurality of second selected touch sensors, and alternately activating each of the first selected touch sensors and each of the second selected touch sensors in sequence to execute the touch detection action.

15. The touch detection method according to claim 10, wherein under the idle mode, making each of the touch sensors execute the touch detection action in sequence, wherein the step of making each of the touch sensors execute the touch detection action in sequence comprises:
  setting a scanning frequency of the touch detection action to be a first frequency under the idle mode, wherein the first frequency is lower than a scanning frequency of the touch detection action with the controller under the normal operation mode.

16. The touch detection method according to claim 10, wherein under the idle mode, making each of the touch sensors execute the touch detection action in sequence, wherein the step of making each of the touch sensors execute the touch detection action in sequence comprises:
  separating the touch sensors into a plurality of first touch sensors and a plurality of second touch sensors; and
  under the idle mode, selecting a part of the first touch sensors to be a plurality of first selected touch sensors, selecting a part of the second touch sensors to be a plurality of second selected touch sensors, and alternately activating each of the first selected touch sensors and each of the second selected touch sensors in sequence according to the first frequency to execute the touch detection action.

* * * * *